Patented Jan. 16, 1945

2,367,423

UNITED STATES PATENT OFFICE 2,367,423

MOLDABLE PLASTIC COMPOSITIONS

Frederick J. Myers, Philadelphia, Pa., assignor to The Resinous Products & Chemical Company, Philadelphia, Pa., a corporation of Delaware No Drawing. Application August 12, 1942, Serial No. 454,532

19 Claims. (Cl. 260—42)

This invention deals broadly with resinous compositions. It concerns a method for preparing heat-curable plastic compositions which are suitable for molding, extruding, calendering, and the like forming operations. It further concerns such compositions which, upon being shaped and heated, yield objects which are generally insoluble in organic solvents, non-reactive, tough, essentially infusible, and of limited thermoplasticity.

With greater particularity, this invention deals with a process and the product resulting thereby, whereby an insoluble, homogeneous mass obtained by working and heating together a soluble alkyd resin and a soluble carbamide and/or triazine-formaldehyde-alcohol condensate is mixed and mechanically worked with a soluble alkyd resin and a soluble carbamide and/or triazine-formaldehyde-alcohol condensate. The soluble resin and condensate act upon the insoluble mass, peptizing and dispersing it so that there results a heat-curable, moldable, extrudable, calenderable plastic mass.

In my patent application Serial No. 287,698, filed August 1, 1939, now U. S. Patent 2,293,164, issued August 18, 1942, and Serial No. 451,211, filed July 16, 1942, there are described reaction products which result by mechanically working and simultaneously heating together certain types of soluble alkyd resins with carbamide-formaldehyde-alcohol condensates. The reaction products are heat-nonconvertible, substantially insoluble, infusible, plastic masses of limited thermoplasticity. I have also found that other types of alkyd resins than those shown in the aforementioned applications can also be reacted by the same method with carbamide-formaldehyde-alcohol condensates. While some of the properties of the final plastic mass obviously depend upon the nature and proportion of the particular reactants selected, the products which result are all heat-converted and infusible. For many applications, as in the coating of paper, leather, and other organic materials, a pre-cured product has many advantages. In some cases, however, the reaction product cannot be used or its utility is greatly limited because the product cannot be shaped and subsequently hardened. Yet the unique properties of reaction products of alkyd resins and carbamide-aldehyde-alcohol condensates may be just those required for a given application. This difficulty is not met by merely mixing an alkyd resin and carbamide-formaldehyde-alcohol. Such a mixture is not readily handled, being sticky and adhesive to mill rolls or other surfaces of machinery available for handling or applying a resinous mass. In addition, they cannot be calendered, thus seriously limiting their usefulness. Furthermore, such mixtures, even if successfully handled, give pin holes and blisters in the cured object formed therefrom.

I have now found that the advantages of the reaction products obtained by mechanically working and simultaneously heating together an alkyd resin and carbamide-formaldehyde-alcohol condensate may be obtained in a heat-curable, millable, moldable, extrudable, calenderable, plastic composition by mechanically mixing one of such reaction products with a soluble alkyd resin and a soluble carbamide-formaldehyde-alcohol condensate until a uniform, apparently homogeneous, mass is obtained. If desired, the soluble alkyd resin and condensate may be added separately to the insoluble reaction product or may be first blended together and the blend milled into the insoluble reaction product. Also, the soluble materials may be used to carry other materials desired in the plastic composition and assist in the incorporation of such materials in the final composition.

The plastic mass thus obtained may be handled on a rubber mill, and may be sheeted, calendered, or extruded with conventional apparatus. The mass may be mixed with fillers, pigments, or modifying agents. The resulting compositions may be shaped and then heated to be rendered insoluble, infusible, and heat-nonconvertible.

The reaction products of a soluble alkyd resin and a carbamide-formaldehyde-alcohol condensate are prepared by mechanically working and simultaneously heating together the two components, as described, for example, in application Serial No. 287,698, filed August 1, 1939. In this application, the reaction of oil-modified, non-drying alkyd resins with urea-formaldehyde-alcohol condensates is fully described. Therein it is shown that by heating a resin formed from a polybasic acid, a polyhydric alcohol, and a non-drying oil or fatty acid with carbamide-formaldehyde-alcohol condensate at 120° to 180° C., an infusible, homogeneous, heat-nonconvertible plastic mass of limited thermoplasticity is formed.

As a polyhydric alcohol, there may be used glycerine, glycol, diethylene glycol, polyethylene glycols, polyglycerol, pentaerythritol, sorbitol, mannitol, and the like, or mixtures thereof. Useful polybasic acids include phthalic, maleic, succinic, adipic, sebacic, citric, etc., and mixtures of such acids. Useful non-oxidizing fatty acids used for modifying the alkyd resins shown in the above identified specification include lauric, myristic, stearic, oleic, ricinoleic, etc., and mixtures of fatty acids as from non-drying or semi-drying oils, or there may be used the oils themselves, such as cocoanut, cottonseed, castor, rape seed, etc., or mixtures of oils or mixtures of oils and acids. There may also be used in such oil-modified, non-drying alkyd resins limited percentages of drying oils or acids, such as linseed, tung, perilla, soya bean, sunflower, hemp seed, etc.

As a carbamide-aldehyde-alcohol condensate, there may be used any of the organic solvent-soluble condensates prepared by reacting urea, thiourea, cyanamide, melamine, thioammeline, ammeline, or other triazine or mixture of such products with formaldehyde and, if desired, other aldehyde and an alcohol, generally in the presence of an acid catalyst. Such condensates are now well known. The most useful and generally available condensates are prepared with alcohols which are liquid at room temperature. Of these, the monohydric aliphatic alcohols of three to eight carbon atoms are preferred, such as isopropyl, butyl, octyl, and the like, but the condensates are not limited to those prepared with this preferred group of alcohols. The condensates of commerce are generally available as concentrated syrups or pastes formed with an excess of the reacted alcohol, or with other solvent, such as toluene, or a mixture of toluene and alcohol.

The reaction products of oil-modified, non-drying alkyd resins and the carbamide condensates provide a particularly useful class of the insoluble, infusible plastic masses used in preparing the heat-curable compositions of this invention. But these reaction products are to be regarded as representing a preferred class and not the sole class of operative alkyd resins. In place of the non-drying alkyds shown above, there may also be used drying oil-modified alkyd resins, in which a drying oil such as linseed, sunflower, perilla, etc., is reacted with one or more polybasic acids and one or more polyhydric alcohols.

There may also be used reaction products based on a non-oil-modified alkyd resin, which is reacted with a carbamide-formaldehyde-alcohol condensate by mechanically working and heating the mixture of resin and condensate. Members of this group of alkyd resins are highly useful in imparting special properties to the compositions of this invention. A preferred subclass of reaction products based on non-oil-modified alkyd resins is described in application Serial No. 451,211, filed July 16, 1942, wherein a dibasic acid of at least six carbon atoms is reacted with a polyhydric alcohol to form an alkyd resin, which is then reacted by mixing and heating with a carbamide or triazine-aldehyde-alcohol condensate. It is preferred here that the alcohol be one which contains not over twelve carbon atoms.

While the above descriptions of alkyd resins and carbamide or triazine condensates have been given to show the nature of the materials combined to give the insoluble, infusible, plastic reaction products which form one of the main classes of reactants for preparing the new compositions, the description of alkyd resins and said condensates will also serve in describing the other main classes of reactants. Among the various types of alkyd resins, the second class of reactants, which may be used in making the compositions of this invention, the oil-modified alkyds, particularly those of the non-oxidizing or non-drying type, sometimes called "element-nonconvertible," form a preferred group. A second preferred group of alkyd resins, serving as reactants, is composed of alkyds made from a dibasic aliphatic acid of at least six carbon atoms and a polyhydric alcohol, particularly a dihydric alcohol.

The third main class of reactants for forming the compositions of this invention consists of organic solvent-soluble condensates made from a carbamide such as urea, thiourea, alkyl ureas, guanidine, or cyanamide, or a triazine such as melamine, ammeline, thioammeline, $\beta,\beta'$-bis-thioammeline diethyl ether, or mixtures of any of these, formaldehyde or formaldehyde and another aldehyde, such as acetaldehyde, and an alcohol. While any alcohol, monohydric or polyhydric, can be reacted with carbamide-aldehyde condensates, such as mono- or dimethylol urea, in many applications it is desirable that the alcohol used in forming the third type of reactant be an aliphatic monohydric alcohol containing three to eight carbon atoms, such as propyl, butyl, amyl, hexyl, or capryl alcohols.

Instead of adding modifying agents to the reaction product of alkyd resin and carbamide and/or triazine-formaldehyde-alcohol condensate, such agents may be incorporated with the mixture of reaction product, alkyd resin, and said condensate. Modifying agents are useful to impart some special property or properties with retention of the fundamental properties imparted by the three basic components of the new compositions. The agents include hard resins, such as natural resins, ester gums, and phenol-formaldehyde condensates, plasticizers, such as dibutyl phthalate, dicapryl phthalate, diethoxyethyl phthalate, dibutyl sebacate, tricresyl phosphate, polyhydric alcohol-adipic or sebacic acid condensates, blown castor oil, or similar plasticizers, waxes, such as candelilla, carnauba, paraffin, montan, beeswax, synthetic hydrogenated waxes, and the like, metal soaps, such as calcium or zinc stearate, or palmitate, anti-oxidants, such as the aryl or alkyl phosphites, etc., pigments, and fillers.

In preparing the compositions of this invention, the proportions of the said insoluble reaction product, soluble alkyd resin, and alcohol-soluble condensate of a carbamide and/or triazine, formaldehyde, and alcohol may be varied over exceptionally wide limits. The optimum proportions will depend not only upon the intended use but also upon the individual components which are selected. The proportions of reaction product to soluble alkyd resin to soluble condensate on a solids basis may desirably vary from 1:1:5 for the harder compositions to 5:5:1 for the softer. Objects of considerable hardness may be formed from compositions containing a high proportion of carbamide-aldehyde-alcohol condensate. Rubbery properties can be increased by using an oil-modified alkyd resin as well as by increasing the proportion of alkyd resin. In the mixing of the three main components to form the new compositions, the mixing apparatus may be cooled, if desired, to limit the heat which usually develops during the mechanical treatment of any plastic mass. In some cases, it is desirable to permit the mass being worked to heat up to facilitate thorough mixing and to help eliminate volatile solvents which might otherwise be liberated during heat-curing of a molded object. In any case, however, time and temperature of mixing are so controlled that the final composition remains heat-curable. This insures that after the plastic composition is shaped as by molding in a form or die, sheeting or calendering onto a support, or extruding in a desired form or over an object such as a wire, rod, or other form, the shaped object can be heat-cured to hold the shape permanently.

The compositions of this invention are useful in many and diverse fields. They may serve as rubber substitutes and as such may be formed and handled on conventional machinery. The new compositions are particularly useful in replacing hard rubber in molded objects. They may also be used in linoleum mixes alone or in conjunction with linoxyn. They may be sheeted for use as gasket stock. They may be calendered onto cloth to give leather-like fabrics or to replace calendered rubber fabrics, oilcloth, and the like. They are also useful as non-penetrating cements and for compounding with both natural and synthetic rubbers.

The invention is further illustrated by the following examples:

Example 1

A mixture of 400 parts of the residual acids obtained in the manufacture of sebacic acid from castor oil by caustic splitting, separation of sebacic acid, and distillation of acids volatile below 270° C. at 4 mm. (as described in U. S. Patent No. 2,267,269, issued December 23, 1941), 200 parts of phthalic anhydride, 133 parts of glycerol, and 510 parts of castor oil was heated at 200° C. until a 50% solution of the resulting product in toluene had a viscosity of G on the Gardner-Holdt scale. 200 parts of this product and 67 parts of a urea-formaldehyde-butanol condensate in butanol and toluene with a solids content of 60% were mechanically worked and heated at 135° C. in a Werner-Pfleiderer mixer to give a cured, flaked product. This was then worked on rubber rolls to give a tough, rubbery, homogeneous mass, which banded well on the rolls and to which five parts of stearic acid, 100 parts of carbon black, and 150 parts of a 50% paste of a urea-formaldehyde-butanol condensate in butanol was added, followed by 50 parts of the above alkyd resin from the residual acids. The mass was worked for twenty-five minutes, sheeted out, and cut into strips, which were wound about two-inch wheels as treads. The wheels were pressed in molds and cured at 130° C. for sixty minutes.

Example 2

419 parts of the above plastic mass was worked with 100 parts of cotton floc and 100 parts of asbestos fibers, sheeted, molded as above, and cured.

Example 3

400 parts of the alkyd resin prepared as in Example 1, 75 parts of a sebacic acid-glycerine condensate, and 150 parts of urea-formaldehyde-butanol condensate as a 50% solution in excess butanol and toluene were worked at 130° to 140° C. until insoluble in hydrocarbons. The resulting product was cooled, placed on the rubber rolls, and worked. There was added ten parts of stearic acid, 82 parts of the same alkyd resin as above, and 400 parts of the 50% urea-formaldehyde-butanol condensate mixed with 200 parts of carbon black. 200 parts of cotton floc and 200 parts of asbestos were then added. When the whole mass was worked until smooth and uniform in texture, it was sheeted out, cut into strips, applied as tread to wheels as before, molded, and cured. The wheels thus obtained were tough, strong, possessed excellent resilience, and were resistant to abrasion.

Example 4

An alkyd resin was prepared by heating at 215° C. 100 parts of phthalic anhydride, 100 parts of residual acids from the manufacture of sebacic acid from castor oil, 60 parts of diethylene glycol, and 25 parts of glycerol. A reaction product was made from 200 parts of this alkyd resin and 15 parts of a urea-melamine-formaldehyde-butanol condensate solids, practically free from excess butanol, but mixed with 10 parts of dibutyl sebacate. A portion of 161 parts of this reaction product was milled, 10 parts of stearic acid added thereto, 150 parts of a mixture of the above alkyd resin (120 parts) and a 50% syrup of a urea-formaldehyde-amyl alcohol condensate in excess alcohol and toluene (30 parts), which had been mixed with 140 parts of carbon black, was thoroughly milled into the reaction product with stearic acid. The final composition was milled hot and calendered onto cloth, which was heated at 120° to 130° C. to give a coated fabric. The coated fabric so prepared was very resistant to the action of organic solvents, exhibited good abrasion resistance, and was far superior to a similar rubber-coated fabric in its resistance to aging, sunlight, etc.

Example 5

There was prepared a reaction product of 17 parts of the alkyd resin from residual acids described in the previous example and 65 parts of a 50% syrup of urea-formaldehyde-butanol in butanol. During the heating and working of this mixture most, if not all, of the free butanol was evaporated. After the reaction product had cooled to about 50° C., it was worked on a rubber mill and 3.3 parts of stearic acid and 60 parts of carbon black were added and thoroughly incorporated by milling. There were then added and incorporated the following ingredients: 31 parts of an alkyd resin made from sebacic acid, glycerine, and glycol, 132 parts of a soft carbon black, 250 parts of a 60% syrup of a urea-formaldehyde-butanol condensate in excess butanol and toluene, 210 parts of cotton floc, 78 parts of asbestos, 10 parts of a phenol-formaldehyde oil-soluble condensate, and 12.5 parts of zinc stearate. The thoroughly milled composition was sheeted, cut into strips, and thus applied to small steel wheels, which were heated under pressure in a mold for 10 minutes at 130° C. and then in an oven at 130° C. for 50 minutes. The cured treads were satisfactory for replacing conventional rubber treads.

The compositions of this invention may be prepared from relatively inexpensive products which are commonly available. They may be varied in many properties and used for many purposes, for which more expensive and/or less available materials have heretofore been required. The compositions of this invention are readily handled, quickly formed, and rendered insoluble by heat in a relatively short time. The products are highly resistant to many types of solvents, to shock, and to abrasion. They possess new properties not previously found in molded, extruded, or calendered articles. Coated fabrics prepared from the softer compositions have excellent flexibility and possess excellent resistance to aging effects.

I claim:

1. A method of preparing a heat-curable, moldable, extrudable, calenderable, plastic composition, which comprises mechanically mixing until a uniform material results, (1) an insoluble, infusible, reaction product of limited thermoplasticity obtained by mechanically working and simultaneously heating until homogeneous a soluble alkyd resin and an alcohol-soluble condensate of formaldehyde, an alcohol, and a member of the group consisting of carbamides and amino-triazines, (2) an alcohol-soluble condensate of formaldehyde, an alcohol that is liquid at ordinary temperatures, and a member of the group consisting of carbamides and amino-triazines, and (3) an organic solvent-soluble alkyd resin.

2. A method of preparing a heat-curable, moldable, extrudable, calenderable, plastic composition, which comprises mechanically working the insoluble, infusible reaction product of limited thermoplasticity, obtained by kneading and heating until homogeneous a soluble alkyd resin and an alcohol-soluble condensate of formaldehyde, an alcohol, and a member of the group consisting of carbamides and amino-triazines, and adding to said reaction product while being worked an alcohol-soluble condensate of formaldehyde, an alcohol that is liquid at ordinary temperatures, and a member of the group consisting of carbamides and amino-triazines, and an organic solvent-soluble alkyd resin.

3. A method of preparing a heat-curable, moldable, extrudable, calenderable, plastic composition, which comprises mechanically mixing together until a uniform material results (1) an insoluble, infusible reaction product of limited thermoplasticity obtained by mechanically working and heating until homogeneous a soluble, fatty oil-modified, non-drying alkyd resin and an organic solvent-soluble carbamide-formaldehyde-alcohol condensate, (2) an alcohol-soluble condensate of formaldehyde, a monohydric aliphatic alcohol of three to eight carbon atoms, and a member of the group consisting of carbamides and amino-triazines, and (3) an organic solvent-soluble alkyd resin.

4. A method of preparing a heat-curable, moldable, extrudable, calenderable, plastic composition, which comprises mechanically mixing together until a uniform material results (1) an insoluble, infusible reaction product of limited thermoplasticity obtained by mechanically working and heating until homogeneous a soluble, fatty oil-modified, non-drying alkyd resin and an organic solvent-soluble carbamide-formaldehyde-alcohol condensate, (2) an alcohol-soluble urea-formaldehyde-butanol condensate, and (3) an organic solvent-soluble alkyd resin.

5. A method of preparing a heat-curable, moldable, extrudable, calenderable, plastic composition, which comprises mechanically mixing together until a uniform material results (1) an insoluble, infusible reaction product of limited thermoplasticity obtained by mechanically working and heating until homogeneous a soluble, fatty oil-modified, non-drying alkyd resin and an organic solvent-soluble carbamide-formaldehyde-alcohol condensate, (2) an alcohol-soluble condensate of formaldehyde, a monohydric aliphatic alcohol of three to eight carbon atoms, and a member of the group consisting of carbamides and amino-triazines, and (3) a soluble, oil-modified, non-drying alkyd resin.

6. A method of preparing a heat-curable, moldable, extrudable, calenderable, plastic composition, which comprises mechanically mixing together until a uniform material results (1) an insoluble, infusible reaction product obtained by mechanically working and heating together until homogeneous a soluble alkyd resin formed from an aliphatic dicarboxylic acid of at least six carbon atoms by reaction with a polyhydric alcohol and an alcohol-soluble condensate of formaldehyde, an alcohol, and a member of the group consisting of carbamides and amino-triazines, (2) an alcohol-soluble condensate of formaldehyde, an alcohol that is liquid at ordinary temperatures, and a member of the group consisting of carbamides and amino-triazines, and (3) an organic solvent-soluble alkyd resin.

7. A method of preparing a heat-curable, moldable, extrudable, calenderable, plastic composition, which comprises mechanically mixing together until a uniform material results (1) an insoluble, infusible reaction product obtained by mechanically working and heating together until homogeneous a soluble alkyd resin formed from an aliphatic dicarboxylic acid of at least six carbon atoms by reaction with a polyhydric alcohol and an alcohol-soluble condensate of formaldehyde, an alcohol, and a member of the group consisting of carbamides and amino-triazines, (2) a soluble carbamide-formaldehyde-alcohol condensate for which the alcohol is a monohydric aliphatic alcohol of three to eight carbon atoms, and (3) an organic solvent-soluble alkyd resin.

8. A method of preparing a heat-curable, moldable, extrudable, calenderable, plastic composition, which comprises mechanically mixing together until a uniform material results (1) an insoluble, infusible reaction product obtained by mechanically working and heating together until homogeneous a soluble alkyd resin formed from an aliphatic dicarboxylic acid of at least six carbon atoms by reaction with a polyhydric alcohol and an alcohol-soluble condensate of formaldehyde, an alcohol, and a member of the group consisting of carbamides and amino-triazines, (2) a soluble urea-formaldehyde-alcohol condensate for which the alcohol is a monohydric aliphatic alcohol of three to eight carbon atoms, and (3) a soluble, oil-modified, non-drying alkyd resin.

9. A method of preparing a heat-curable, moldable, extrudable, calenderable, plastic composition, which comprises mechanically mixing together until a uniform material results (1) an insoluble, infusible reaction product obtained by mechanically working and heating together until homogeneous a soluble alkyd resin formed from an aliphatic dicarboxylic acid of at least six carbon atoms by reaction with a polyhydric alcohol and an alcohol-soluble condensate of formaldehyde, an alcohol, and a member of the group consisting of carbamides and amino-triazines, (2) an alcohol-soluble condensate of formaldehyde, an alcohol that is liquid at ordinary temperatures, and a member of the group consisting of carbamides and amino-triazines, and (3) a soluble alkyd resin formed from an aliphatic dibasic acid of at least six carbon atoms by reaction with a polyhydric alcohol.

10. A method of preparing a heat-curable, moldable, extrudable, calenderable, plastic composition, which comprises mechanically mixing until a uniform material results (1) an insoluble, infusible reaction product of limited thermoplasticity, obtained by mechanically working and simultaneously heating until homogeneous a soluble alkyd resin and an alcohol-soluble condensate of formaldehyde, an alcohol, and a member of the group consisting of carbamides and amino-triazines, (2) an alcohol-soluble condensate of formaldehyde, an alcohol that is liquid at ordinary temperatures, and a member of the group consisting of carbamides and amino-triazines, (3) an organic solvent-soluble alkyd resin, and (4) a pigment.

11. A method of preparing a heat-curable, moldable, extrudable, calenderable, plastic composition, which comprises mechanically mixing until a uniform material results (1) an insoluble, infusible reaction product of limited thermoplasticity, obtained by mechanically working and simultaneously heating until homogeneous a soluble alkyd resin and an alcohol-soluble condensate of formaldehyde, an alcohol, and a member of the group consisting of carbamides and amino-triazines, (2) an alcohol-soluble condensate of formaldehyde, an alcohol that is liquid at ordinary temperatures, and a member of the group consisting of carbamides and amino-triazines, (3) an organic solvent-soluble alkyd resin, and (4) filling materials.

12. A heat-curable, moldable, extrudable, calenderable, plastic composition, which comprises an intimate mixture of uniform consistency of (1) an insoluble, infusible reaction product of limited thermoplasticity, obtained by mechanically working and simultaneously heating together until homogeneous a soluble alkyd resin and an alcohol-soluble condensate of formaldehyde, an alcohol, and a member of the group consisting of carbamides and amino-triazines, (2) an alcohol-soluble condensate of formaldehyde, an alcohol that is liquid at ordinary temperatures, and a member of the group consisting of carbamides and amino-triazines, and (3) an organic solvent-soluble alkyd resin.

13. A heat-curable, moldable, extrudable, calenderable, plastic composition, which comprises a mixture of uniform consistency in which the insoluble, infusible, reaction product, obtained by mechanically working and heating together a soluble alkyd resin and an alcohol-soluble condensate of formaldehyde, an alcohol, and a member of the group consisting of carbamides and amino-triazines, is dispersed in an organic solvent-soluble alkyd resin and an alcohol-soluble condensate of formaldehyde, an alcohol that is liquid at ordinary temperatures, and a member of the group consisting of carbamides and amino-triazines.

14. A heat-curable, moldable, extrudable, calenderable, plastic composition, which comprises a mixture of uniform consistency in which the insoluble, infusible, reaction product, obtained by mechanically working and simultaneously heating together a soluble, fatty oil-modified, non-drying alkyd resin and an alcohol-soluble condensate of formaldehyde, an alcohol, and a member of the group consisting of carbamides and amino-triazines, is dispersed in an alcohol-soluble condensate of a carbamide, formaldehyde, and an aliphatic monohydric alcohol of three to eight carbon atoms and an organic solvent-soluble alkyd resin.

15. A heat-curable, moldable, extrudable, calenderable, plastic composition, which comprises a mixture of uniform consistency in which the insoluble, infusible, reaction product, obtained by mechanically working and simultaneously heating together until homogeneous a soluble alkyd resin formed from an aliphatic dicarboxylic acid of at least six carbon atoms by reaction with a polyhydric alcohol and an alcohol-soluble condensate of formaldehyde, an alcohol, and a member of the group consisting of carbamides and amino-triazines, is dispersed in an alcohol-soluble condensate of a carbamide, formaldehyde, and an aliphatic monohydric alcohol of three to eight carbon atoms and an organic solvent-soluble alkyd resin.

16. A heat-curable, moldable, extrudable, calenderable, plastic composition, which comprises a mixture of uniform consistency in which the insoluble, infusible, reaction product, obtained by mechanically working and heating together until homogeneous a soluble alkyd resin and an alcohol-soluble urea-formaldehyde-alcohol condensate, is dispersed in a mixture of an organic solvent-soluble urea-formaldehyde-alcohol condensate in which the alcohol is an aliphatic monohydric alcohol of three to eight carbon atoms and an organic solvent-soluble alkyd resin.

17. A heat-curable, moldable, extrudable, calenderable, plastic composition, which comprises a mixture in which the insoluble, infusible, reaction product, obtained by mechanically working and heating together until homogeneous a soluble alkyd resin and an alcohol-soluble carbamide-formaldehyde-alcohol condensate, is dispersed in a mixture comprising an organic solvent-soluble alkyd resin, an organic solvent-soluble carbamide-formaldehyde-alcohol condensate for which the alcohol is an aliphatic monohydric alcohol of three to eight carbon atoms, and a filler.

18. A plastic object which is insoluble, infusible, tough, resilient, and of limited thermoplasticity and which comprises a thermally cured composition comprising an insoluble reaction product, obtained by mechanically working and heating together until homogeneous a soluble alkyd resin and an organic solvent-soluble carbamide-formaldehyde-alcohol condensate, dispersed in a soluble alkyd resin and an organic solvent-soluble carbamide-formaldehyde-alcohol condensate in which the alcohol group is from an aliphatic monohydric alcohol of three to eight carbon atoms.

19. A plastic object which is insoluble, infusible, tough, resilient, and of limited thermoplasticity and which comprises a filler and a thermally cured composition comprising an insoluble reaction product, obtained by mechanically working and heating together until homogeneous a soluble alkyd resin and an organic solvent-soluble carbamide-formaldehyde-alcohol condensate, dispersed in a soluble alkyd resin and an organic solvent-soluble carbamide-formaldehyde-alcohol condensate in which the alcohol group is from an aliphatic monohydric alcohol of three to eight carbon atoms.

FREDERICK J. MYERS.